United States Patent [19]

Burchette

[11] Patent Number: 4,552,386
[45] Date of Patent: Nov. 12, 1985

[54] JOINTS BETWEEN CYLINDERS OF DIFFERENT MATERIALS

[75] Inventor: Herbert L. Burchette, North Palm Beach, Fla.

[73] Assignee: United Technologies Corporation, Hartford, Conn.

[21] Appl. No.: 525,344

[22] Filed: Aug. 22, 1983

[51] Int. Cl.[4] .............................................. F16L 55/00
[52] U.S. Cl. .................................... 285/187; 285/363; 285/405; 285/414; 285/138
[58] Field of Search ............... 285/187, 363, 405, 414, 285/138

[56] References Cited

U.S. PATENT DOCUMENTS

| 2,396,320 | 3/1946 | Gaudenzo et al. | 285/187 |
| 3,088,758 | 5/1963 | Chilton | 285/187 |
| 3,093,398 | 6/1963 | Fawcett et al. | 285/187 X |
| 3,210,098 | 10/1965 | Watts | 285/187 X |
| 3,378,283 | 4/1968 | Boocock et al. | 285/187 |
| 3,632,143 | 1/1972 | Lessmann | 285/187 |
| 3,746,374 | 7/1973 | Sedgevick et al. | 285/187 |
| 4,185,857 | 1/1980 | Saracco | 285/363 |
| 4,349,203 | 9/1982 | Schulke | 285/187 X |
| 4,438,956 | 3/1984 | Jones et al. | 285/363 X |

Primary Examiner—Richard J. Scanlan, Jr.
Attorney, Agent, or Firm—Jack N. McCarthy

[57] ABSTRACT

A connection or attachment joint between two coaxial cylindrical members having substantially different thermal coefficients of expansion. Each cylindrical member has an outstanding flange at its mating end with the end portions of the cylindrical members being separated by an annular resilient strain pad to evenly absorb radial growth between the cylinders and the flanges being held together in a manner to permit one flange to slide over the other flange as a result of thermal expansions and contractions. A torque transfer arrangement is provided to control relative rotation between the cylindrical members.

8 Claims, 7 Drawing Figures

JOINTS BETWEEN CYLINDERS OF DIFFERENT MATERIALS

DESCRIPTION

1. Technical Field

This invention relates to attachment joints connecting the ends of cylindrical members together where they are formed of materials having differing coefficients of thermal expansion, and subjected to high temperatures during their use.

2. Background Art

Reference patents are shown by the following: U.S. Pat. Nos. 4,349,203; 3,746,374; 3,632,143; 2,396,320; 3,210,098; 3,088,758; 3,093,398; 3,378,283; however this prior art does not disclose the joint herein disclosed, having the mating flanged ends.

3. Disclosure of Invention

This invention describes a connection or attachment joint between two coaxial cylindrical members having substantially different thermal coefficients of expansion, said connection being subjected to high temperatures.

One cylindrical member having a coefficient of expansion has a radial flange extending outwardly a spaced distance from its end, a second cylindrical member having a lower coefficient of expansion has a radial flange extending outwardly from its end and this second cylindrical member is placed over the end of said one cylindrical member and spaced therefrom in a telescoping fashion with its radial flange against the radial flange of said one cylindrical member; a strain absorbing pad is placed in the annular space between the telescoping ends of said cylindrical members; a torque transfer means prevents relative rotation between said cylindrical members and said radial flanges are held together for sealing by axial load means which provide for differences in radial growth between said two flanges.

In a modification, one cylindrical member having a coefficient of expansion has an end portion reduced to form a short cylindrical section and a radial flange projects inwardly from the end of the reduced cylindrical section, a second cylindrical member having a lower coefficient of expansion has a radial flange extending inwardly therefrom at a short distance from its end, leaving a short cylindrical end extension and when the reduced end portion is placed within the short cylindrical end extension they are spaced from each other in a telescoping fashion when the radial flanges meet. A strain absorbing pad is placed in the annular space between the telescoping ends of said cylindrical members; said radial flanges are held together by axial load means which provide for differences in radial growth in the flanges.

BEST MODE FOR CARRYING OUT THE INVENTION

Figure 1:
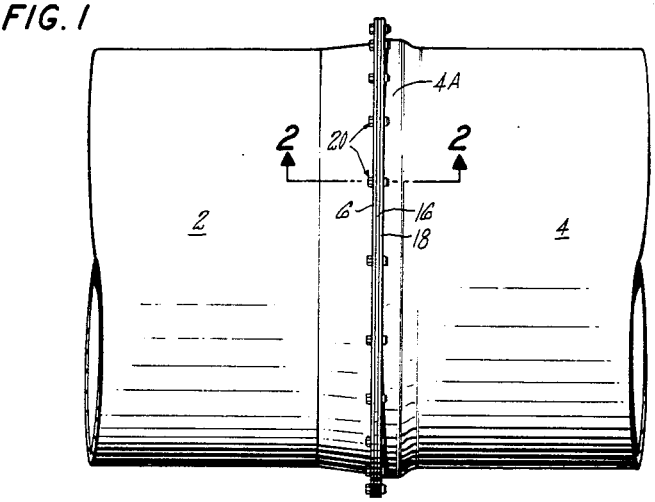
FIG. 1 is a side view, at room temperature, showing the mating outer diameter flanges of two cylinders.
Figure 2:
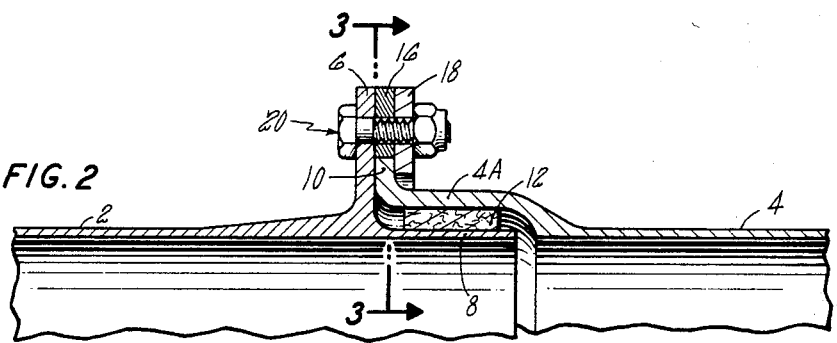
FIG. 2 is a view taken on the line 2—2 of FIG. 1 showing the attachment joint or connection.

FIG. 1 shows the end of a cylindrical member 2 connected to the end of a cylindrical member 4. Cylindrical member 2 is formed of a material having a higher coefficient of thermal expansion than the material of cylindrical member 4. As seen in FIG. 2, cylindrical member 2 has a radial annular flange 6 projecting outwardly therefrom at a short distance from its end, leaving a short cylindrical end extension 8. Said cylindrical member 4 has a radial annular flange 10 projecting outwardly from the end of the cylindrical member 4.

The end portion of cylindrical member 4 is enlarged to form a short cylindrical section 4A which will enclose and be spaced outwardly from the short cylindrical end extension 8 of cylindrical member 2, when flange 10 is positioned against flange 6. An annular resilient strain pad 12 is positioned in the annular space between the enlarged section 4A of cylindrical member 4 and the cylindrical end extension 8 of cylindrical member 2. This pad 12 is to evenly absorb the radial growth and maintain concentricity of the two cylindrical members. The pad 12 is fixed to the short cylindrical end extension 8 for ease of assembly and has a light press fit at room temperature. The pad 12 is compressed as the radial thermal load is increased and expands as the load decreases.

Figure 3:
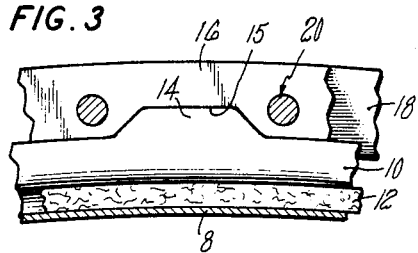
FIG. 3 is a fragmentary view taken on the line 3—3 of FIG. 2.
Figure 5:
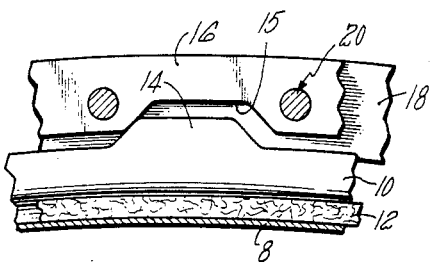
FIG. 5 is a view of FIG. 3 after expansion has taken place.

Radial annular flange 10 has a plurality of outwardly extending radial projections 14, shown in FIG. 3, to act as torque lugs. In this modification a torque and spacer ring 16 is used, said torque ring 16 being connected to flange 6 outwardly of, and in line with, flange 10. Said torque ring 16 has matching recesses 15 to receive the torque lugs 14 fully at room temperature, and to have partial contact at operating temperature (see FIG. 5) after expansion, to prevent relative rotation between cylindrical member 2 and 4 when necessary.

Figure 4:
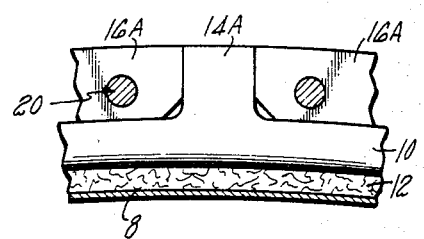
FIG. 4 is a fragmentary view taken on the line 3—3 of a modification of FIG. 2.

In a modification shown in FIG. 4, the radial annular flange 10 has a plurality of outwardly extending radial projections 14A. These extensions extend to the full height of annular flange 6 and torque ring segments 16A are used between the radial projections 14A. These act in the same manner as the radial projections 14.

Said torque and spacer ring 16 is held in position by a holding or axial loading ring means 18, which can be formed of a plurality of arcuate segments. The holding ring means 18 not only covers the ring 16 but extend inwardly over the flange 10 of cylindrical member 4 to insure that at maximum expansion the flanges 6 and 10 do not separate. A plurality of bolts 20 extend through the flange 6, torque and spacer ring 16, and holding (or axial loading) ring means 18. The ring 16 always acts as a spacer to allow for the flange 6 of the material of the higher coefficient of thermal expansion to slide over the flange 10 and radial projections 14 of the material of the lower coefficient of thermal expansion and act as a seal during use. The thickness of the torque and spacer ring 16 is determined by the relative expansion of the material of flange 10 and the torque and spacer ring 16 to provide spacing.

Figure 6:
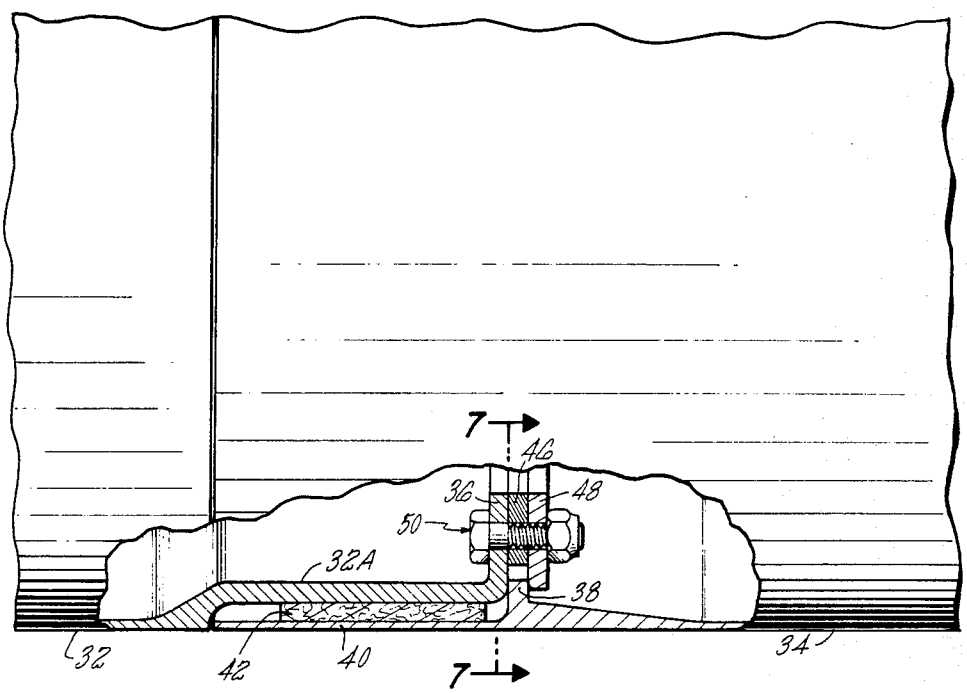
FIG. 6 is a side view similar to FIG. 2 where the mating flanges are on the inner diameter of two cylinders.

FIG. 6 shows a modification of the end of a cylindrical member 32 connected to the end of a cylindrical member 34. Cylindrical member 32 is formed of a material having a higher coefficient of thermal expansion than the material of cylindrical member 34. The end portion of cylindrical member 32 is reduced to form a short cylindrical section 32A, said cylindrical member 32 has a radial annular flange 36 projecting inwardly from the end of reduced cylindrical section 32A. Cylindrical member 34 has a radial annular flange 38 projecting inwardly therefrom at a short distance from its end, leaving a short cylindrical end extension 40.

When flange 38 is positioned against flange 36, the reduced cylindrical section 32A is enclosed by and spaced inwardly from the cylindrical end extension 40. An annular resilient strain pad 42 is positioned in the annular space between the reduced cylindrical section 32A and the cylindrical end extension 40. This pad 42 serves as pad 12 in FIG. 2.

Figure 7:
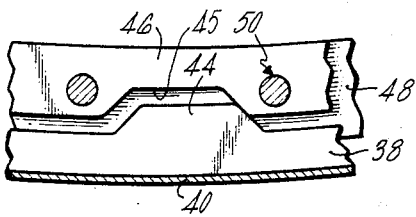
FIG. 7 is a fragmentary view taken on the line 7—7 of FIG. 6.

Radial annular flange 38 has a plurality of inwardly extending radial projections 44, shown in FIG. 7, to act as torque lugs. A torque and spacer ring 46 is used, said torque ring 46 being connected to flange 36, inwardly of, and in line with, flange 38. Said torque ring 46 has matching recesses 45 to partially receive the torque lugs 44 at room temperature (see FIG. 7), and to have substantially full engagement at maximum operating temperature and expansion, thereby preventing relative rotation between cylindrical members 32 and 34.

Said torque and spacer ring 46 is held in position by a holding or axial loading ring means 48, which can be formed of a plurality of segments, as can torque and spacer ring 46. The holding ring means 48 not only covers the ring 46 but extends outwardly over the flange 38 of cylindrical member 34 to insure that at maximum expansion the flanges 36 and 38 do not separate.

A plurality of bolts 50 extend through the flange 36, torque and spacer ring 46, and holding (or axial loading) ring means 48. The ring 46 always acts as a spacer to allow for the flange 36 of the material of the higher coefficient of thermal expansion to slide over the flange 38 and radial projections 44 of the material of the lower coefficient of thermal expansion and act as a seal during use.

Attachment joints, in some applications such as aircraft jet engines, can attain extremely high temperatures, and to accommodate these temperatures, different types of materials are used, some having substantially different coefficients of thermal expansion. For example, some composite materials are being used to withstand an extremely high temperature with the composites having a coefficient of thermal expansion in the range of $1.0 \times 10^{-6}$ and $1.5 \times 10^{-6}$ inch/inch/degree F. Three composites having such a coefficient are COMPGLAS ™, Carbon/Carbon, and Graphite/Polymide. Since the coefficient of thermal expansion of metals, such as nickel and steel alloys, average on the order of $7 \times 10^{-6}$ inch/inch/degree F., it can be seen that when cylindrical members of a composite and a metal, such as just referred to, are to be joined, with the substantial difference in the coefficients of thermal expansion, if high temperatures are reached at these joints, there will be a relatively large differential growth, and if large diameter cylinders are used, such as between the exhaust duct of an aircraft jet engine and an afterburner, a radial differential growth could exceed 0.250 inches. The use of the joint, disclosed above, would permit this growth without overstressing the metal or composite part. While the joining of cylindrical members of a composite and a metal are referred to, it is to be understood that this joint can be effectively used for other materials, such as metal to metal where there is a difference in the coefficient of thermal expansion of the metals.

The strain pad (12 or 42) can be made of several materials known to one skilled in the art. If the joint must accommodate a temperature of 600° F. and above, then some resilient strain absorbing materials which may be used are Feltmetal, Vermiculite and Brunsbond.

As referred to above, the ring 16 and 46 acts as a spacer to allow relative radial movement between the flanges 6 and 10 of FIG. 2, and 36 and 38 in FIG. 6, respectively. It is noted that where flanges 6 and 36 have been contemplated as being made from metal and flanges 10 and 38 being made from a composite, the rings 16 and 46, respectively, would be made of metal just slightly thicker than the flange 10 or 38 in order to keep the axial compressive load created by the bolts on the composite material of the flange at an acceptable level and allow the relative radial movement necessary between the composite and metal flanges during operation.

I claim:

1. A connection between the ends of two coaxial cylindrical members having substantially different thermal coefficients of expansion, one cylindrical member having a first radial annular flange projecting therefrom, said first radial annular flange being spaced a short distance from its end providing a short cylindrical end extension, said second cylindrical member having a second radial annular flange projecting therefrom in the same radial direction, said second cylindrical member having said second radial annular flange located at the end of the second cylindrical member, said end of said cylindrical member having said second radial annular flange extending around and being radially spaced from said short cylindrical extension with the second radial annular flange abutting said first radial annular flange, said circumference of one of said radial annular flanges having radial projections, a torque and spacer means connected to said other radial annular flange adjacent the circumference of said one of said radial annular flanges and having contact with said radial projections to prevent a rotating movement of one of said cylindrical members with respect to the other cylindrical member, an axial load means connected to said other radial annular flange through said torque and spacer means to prevent axial flange separation between said first radial annular flange and said second radial annular flange and permit thermal growth therebetween, an annular resilient strain pad positioned between said short cylindrical extension and said other cylindrical member radially spaced therefrom to absorb radial growth and maintain said two cylindrical members concentric.

2. A connection as set forth in claim 1 wherein said one cylindrical member is formed of a material having the greater thermal coefficient of expansion, said second cylindrical member being formed of material having a substantially smaller thermal coefficient of expansion, said circumference of said second radial annular flange having radial projections, said torque and spacer means being connected to said first radial annular flange, and said axial load means being connected to said first radial annular flange.

3. A connection as set forth in claim 1 wherein said torque and spacer means includes recess means for receiving said radial projections.

4. A connection as set forth in claim 2 wherein said axial load means extends inwardly over said second radial annular flange.

5. A connection as set forth in claim 2 wherein said one cylindrical member is formed of a metal and said second cylindrical member is formed of a composite.

6. A connection as set forth in claim 5 wherein said composite has a coefficient of thermal expansion below $2.0 \times 10^{-6}$ inch/inch/degree F. and the metal has a coefficient of thermal expansion above $6 \times 10^{-6}$ inch/inch/degree F.

7. A connection between the ends of two coaxial cylindrical members having substantially different thermal coefficients of expansion, one cylindrical member having a first radial annular flange projecting therefrom, said first radial annular flange being spaced a short distance from its end providing a short cylindrical end extension, said second cylindrical member having a second radial annular flange projecting therefrom in the same radial direction, said second cylindrical member having said second radial annular flange located at the end of the second cylindrical member, said end of said second cylindrical member having said second radial annular flange extending over and being radially spaced from said short cylindrical end extension with the second radial annular flange abutting said first radial annular flange, spacer means connected to said first radial annular flange outwardly of the outer circumference of said second radial annular flange, an axial load means connected to said first radial annular flange through said spacer means and extending inwardly over said second radial annular flange to prevent axial flange separation between said first radial annular flange and said second radial annular flange and permit thermal growth therebetween, an annular resilient strain pad positioned between said short cylindrical end extension and said other cylindrical member radially spaced therefrom to absorb radial growth and maintain said two cylindrical members concentric.

8. A connection as set forth in claim 7 wherein said outer circumference of said second radial annular flange has outwardly extending radial projections, and said spacer means having recess means for receiving said radial projections to prevent a rotating movement of one of said cylindrical members with respect to the other cylindrical member.

* * * * *

UNITED STATES PATENT AND TRADEMARK OFFICE
CERTIFICATE OF CORRECTION

PATENT NO. : 4,552,386

DATED : 11/12/85

INVENTOR(S) : Herbert L. Burchette

It is certified that error appears in the above-identified patent and that said Letters Patent is hereby corrected as shown below:

Column 1, after the title insert the following paragraph:

-- The Government has rights in this invention pursuant to Contract No. N00014-81-C-0202 awarded to the Navy.--

Signed and Sealed this

Seventh Day of February, 1989

Attest:

DONALD J. QUIGG

Attesting Officer

Commissioner of Patents and Trademarks